March 5, 1963

H. J. MIHM 3,079,980

PAINT SCRAPER

Filed Nov. 23, 1959

Inventor
Howard J. Mihm
by Hill, Sherman, Meroni, Gross & Simpson Attys.

United States Patent Office 3,079,980
Patented Mar. 5, 1963

3,079,980
PAINT SCRAPER
Howard J. Mihm, De Kalb, Ill., assignor to Turner Corporation, Sycamore, Ill., a corporation of Illinois
Filed Nov. 23, 1959, Ser. No. 854,925
2 Claims. (Cl. 158—13.6)

The present invention relates to apparatus arranged to remove paint and other heat sensitive coatings from surfaces such as, for example, wood or metal. More particularly, the invention concerns the provision of improved scraping apparatus incorporating a rigid paint scraping blade of heat-resistant material unitarily associated with a heating torch arranged to heat the painted area immediately adjacent the blade and, simultaneously, heat the blade itself.

In accordance with the principles of the present invention, a scraper blade is rigidly secured to a longitudinally extending burner unit. Preferably, the burner unit is carried by a relatively rigid handle extending longitudinally thereof and constructed of tubing to simultaneously provide a rigid support for the scraper blade and a tubular passage for the torch fuel. The blade extends longitudinally of the burner unit and is preferably positioned to diverge slightly away from the longitudinal axis of the burner to a transversely extending blade edge. A curved burner flame spreader extends longitudinally of the burner unit on the side thereof opposite to that of the scraper blade and curves, generally arcuately, toward the scraper blade at a point axially beyond the end of the burner unit. The arcuately deflected portion of the flame spreader extends across the end of the burner unit thereby deflecting the burner flame against the scraper blade. Additionally, the curved shield is provided with enclosing side walls controlling the lateral expansion of the flame and substantially confining it to the scraper blade and the coating area ahead of the scraper blade.

In accordance with one form of the invention, the scraper blade is constructed of stamped metal pierced in a manner simultaneously providing an air draft aperture for the burner unit and also providing a supporting tab surrounding the burner unit itself to provide additional support for the scraper blade and also to provide a reflecting surface at the rear of the flame spreader chamber. Likewise, the rearmost end of the stamped scraper blade is bent transversely of the burner unit for attachment thereto. This attachment surface co-operates with a similar surface on the flame spreader to provide rigid support for the spreader relative to the scraper blade and burner. Accordingly, a simple, yet extremely rigid combined scraper blade and burner unit, with flame spreader, is provided.

Accordingly, it is an object of the present invention to provide an improved combination scraper and flame spreader apparatus adapted for the simultaneous heating and scraping of coated surfaces.

Another object of the present invention is to provide an integrated paint scraper and heater providing a closely controlled and confined flame.

Still another object of the present invention is the provision of a unitary burner for propane torches or the like having a rigid tubular burner support forming the fuel conduit and the carrying handle therefor, which burner conduit simultaneously rigidly carries a paint scraper and burner flame deflector means for deflecting the burner flame against the scraper in an efficient manner.

A feature of the invention is the provision of a shroud around the burner unit and transversely across the open end of the burner to deflect the burner flame laterally against a scraper blade while simultaneously confining the flame against undue lateral expansion beyond the side edges of the scraper blade.

Another feature of the invention is the provision of stamped, pierced, tabs extending from the scraper blade transversely across and around the burner unit at spaced longitudinal points to provide rigid support for the scraper blade relative to the burner while simultaneously providing an air aperture for the burner unit and a rigidifying support for the attachment of a flame spreading shroud.

Still other and further objects and features of the present invention will at once become apparent from a consideration of the attached drawings wherein one embodiment of the present invention is shown, by way of illustration only, and wherein.

As shown on the drawings.

Figure 2:
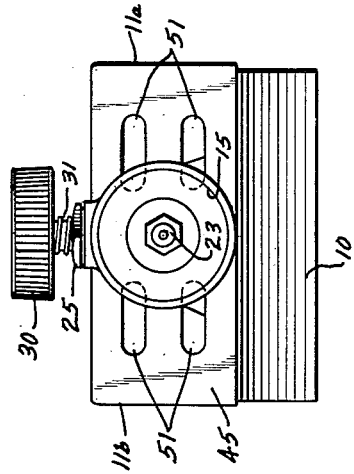
FIGURE 2 is an end elevational view.
Figure 3:
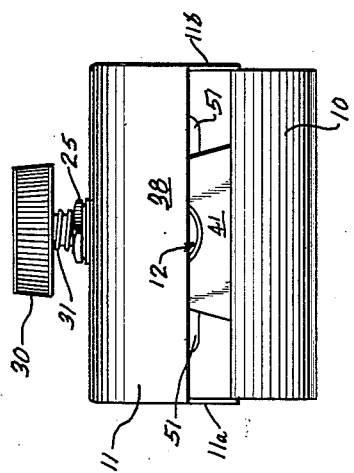
FIGURE 3 is an end elevational view of the apparatus taken from the left hand end of FIGURE 1.

As shown in the figures, the paint scraper of the present invention incorporates a scraper blade 10 and flame spreader 11 unitarily associated with burner 12, a rigid fuel supply conduit 13 and fuel control valve 14. The valve 14 is provided with a threaded end 15 adapted for co-operation with a similarly threaded fuel tank indicated in dotted lines at 16. The fuel tank 16 is of conventional form and may, for example, comprise a steel pressurized container containing propane gas or similar fuel combustible in the presence of air.

As shown, the threaded coupling 15 is connected to a rigid fuel tank. However, it will be recognized by those working in the field that it may be coupled to an extension flexible supply line to permit utilization of fuel supply tanks of large size. In such a case, of course, the valve body 14 may be provided with a pistol-shaped grip or other standard form of manual handle for convenience in manipulating the paint scraper.

The valve generally indicated at 14 comprises a housing 17 apertured at 18 to receive the rigid conduit 13. As shown, the conduit 13 is seated in the aperture 18 by means of a pressure type fitting comprising an annular ring 19 of triangular cross-section which co-operates with wedging surface 20 upon the application of axial pressure by nut 21. Thus, as nut 21 is tightened in the recess 18, the ring 19 is radially inwardly compressed against conduit 13 to provide a fuel-tight and extremely rigid seal. Fuel is directed, under pressure from tank 16, to the conduit 13 via the tank valve actuating nozzle 23 and conduit 24. The passage of fuel through conduit 24 is controlled by the needle valve generally indicated at 25 which comprises a needle 26 threadedly secured in the guide body 27 which is, in turn, threadedly secured in the housing 17. The guide body 27 is rigidly secured relative to the housing 17 by means of a lock nut 28. As shown, the needle 26 is sealed relative to the housing 17 by means of a conventional O-ring 29 and is adjusted by means of a knob 30 held under tension by compression spring 31. Thus, in the arrangement shown, when the body 14 is threaded onto the pressurized fuel tank 16, the member 23 opens the conventional Schrader-type fuel tank valve and fuel is directed to the burner 12 by way of the valve 25.

Fuel passing through the conduit 13 is conducted to the burner 12 via burner nozzle 35. The fuel passing through the nozzle 35 is mixed with air by means of mixing apertures 36 and burns, upon ignition by match or other means, in the area 37.

Figure 1:
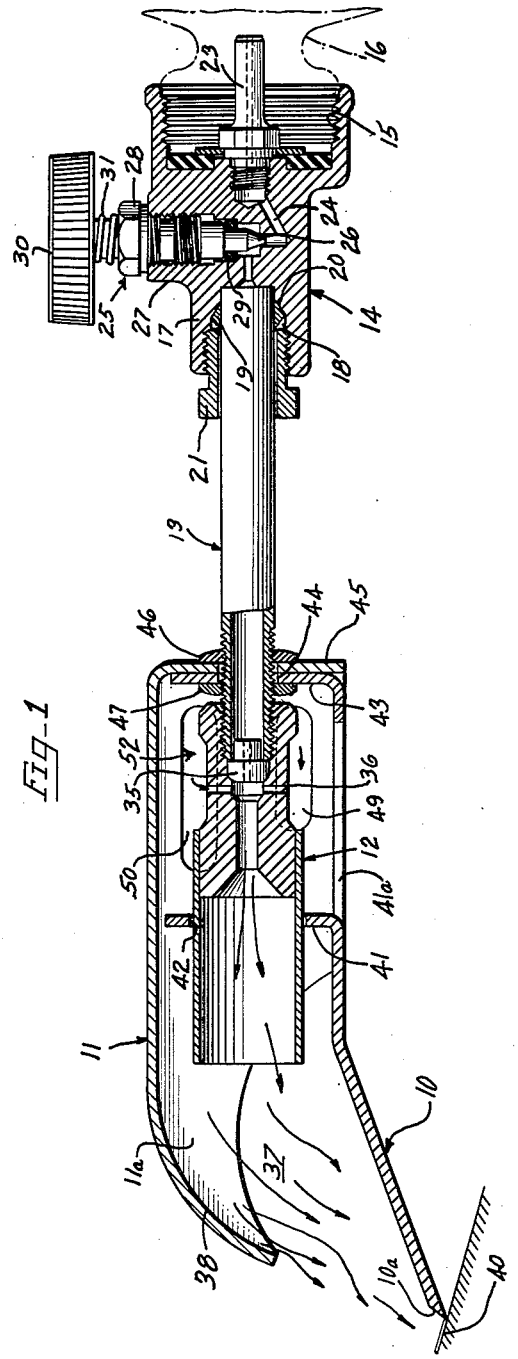
FIGURE 1 is a side elevational view, in cross-section, of the combined flame spreader and scraper of the present invention.

As will be observed from a consideration of the drawings, in the absence of the scraper portion 10 at the flame spreader 11, fuel would burn in a generally cylindrical flame projecting straight ahead of the burner 12. However, as shown in FIGURE 1, the flame spreader 11 is provided with a generally arcuately curved spreader portion 38 extending transversely of the burner 12 in a manner deflecting the burning fuel transversely of the burner against the scraper blade 10 and the area of coated surface, such as for example, surface 40, immediately adjacent the point of contact with blade 10. Further, the side walls 11a and 11b confine the flame against lateral spreading, thereby more firmly directing it against the spreader blade 10. As a result of this confined deflection of the burning fuel, the flame is controlled accurately and is positioned directly on the spreader blade 10 and the coated surface immediately ahead of the scraper blade. As a result, an extremely efficient heating of the coated surface is provided and, further, the blade itself is maintained at a heat sufficient to permit ready peeling of such coatings as external house paints or the like.

In accordance with the present invention, the scraper blade 10 and the spreader 11 are preferably stamped from sheet metal. While rigidity of the members 10 and 11 is extremely important in the present invention since the scraping load is carried by the scraper blade 10 and the parts associated therewith, this rigidity is achieved by interlocking the members 10 and 11 relative to each other and relative to the burner 12. Thus, in the construction of the scraper blade 10, a tang 41 is struck up from the main body of the blade as shown in FIGURE 1. The tang is provided with an aperture 42 slightly larger than the diameter of the burner 12. An end plate tang 43 is likewise struck up laterally from the blade 10 and is apertured at 44 for relatively snug contact with the conduit 13. Similarly, the spreader member 11 is drawn from a sheet of material to provide the curved surface 38 and the side walls 11a and 11b. At the same time, an upstanding end wall 45 is provided. Upon assembly of the blade 10 and the spreader member 11, on the conduit 13 by means of nuts 46 and 47, and upon subsequent positioning of the burner 12 on the threaded end of the conduit 13, in the aperture 42, an extremely rigid scraper blade and spreader assembly is provided. It will be seen that as assembled, the transverse surfaces 43 and 45 co-operate to position the members 10 and 11 rigidly relative to the conduit 13. Further, the tang 41 reinforces this positioning so that scraper forces applied to the blade 10 will be transferred to the conduit 13 at two places, namely, the burner 12 and the surface of the conduit itself.

It will be observed that although the spreader member 11 combines with the scraper blade 10 to substantially enshroud the burner 12, adequate air is provided for combustion purposes. Thus, upon striking the tang 41 from the main body of the scraper blade, an aperture 41a is provided through which air may pass to the mixing passages 36. Additionally, air passages 49 and 50 may be provided in the sidewalls 11a and 11b and, if desired, additional air passageways may be provided at 51 in the rear surfaces 43 and 45 of the respective members 10 and 11 as shown in FIG. 2. By this arrangement, an air supply space generally indicated at 52 is provided behind the tang 41 and is generally separated from the combustion area 37 by the tang 41. The tang 41 also operates to reflect heat toward the area 37 and together with walls 11a, 11b to confine the flame. It has been found that this arrangement provides an extremely efficient burner assembly having sufficient rigidity to permit very satisfactory scraping of painted and other similarly coated surfaces with a minimum expenditure of fuel.

In operation of the device, it will be understood that the flame may be adjusted, in length relative to the blade 10 by needle valve 25. As the valve is opened the flame extends further toward the edge 10a until in the wide-open position the flame extends well over the area 40 ahead of the blade.

It will, of course, be understood that variations may be made in the specific details of the structure illustrated, without departing from the scope of the novel concepts of the present invention. It is, accordingly, my intention that the scope of the present invention be limited solely by that of the hereinafter appended claims.

I claim as my invention:

1. Apparatus for scraping a surface, comprising a burner unit having an open end providing a longitudinally projecting flame and a closed end having a plurality of air mixing passageways therein and rigidly connected to a rigid fuel supply conduit, a sheet metal scraper blade having a scraping edge generally transverse to the axis of said burner and side edges extending generally longitudinally of said burner, means fixedly securing said blade relative to said burner and conduit in position projecting longitudinally beyond the open end of said burner and diverging laterally away from the longitudinal axis of said burner in the direction of flame extension, a flame spreader rigidly secured relative to said burner on the side thereof opposite said blade, said spreader comprising a deflecting surface projecting beyond the burner and extending at least partially across the open end of said burner to deflect the flame thereof laterally toward said blade adjacent said scraping edge, said flame spreader having sidewalls extending toward the side edges of said blade and acting to generally enclose said burner, said blade having a tang struck upwardly therefrom toward said spreader and having an aperture surrounding said burner and said means fixedly securing said blade comprising a second tang struck upwardly laterally from the blade at a point spaced longitudinally from said first tang and rigidly secured to said conduit, said blade, spreader, and first tang serving to provide a confined flame area heating the edge of said blade and the surface adjacent thereto ahead of said first tang.

2. Apparatus for scraping a surface, comprising a generally cylindrical burner unit connected rigidly at one end to a rigid fuel supply conduit forming a handle means and having an open end providing a longitudinally projecting flame, said burner having a plurality of air mixing passageways therein, a sheet metal scraper blade having a scraping edge generally transverse to the axis of said burner and side edges extending generally longitudinally of said burner and diverging away from the longitudinal axis of the burner in the direction of flame extension, a flame spreader rigidly secured relative to said burner on the side opposite said blade, said spreader comprising a deflecting surface projecting longitudinally beyond the burner and extending at least partially across the open end of said burner to deflect the flame thereof laterally toward said scraping edge, said flame spreader having side walls extending toward the side edges of said blade and acting to substantially enclose the burner unit, said blade having a pair of longitudinally spaced tangs struck upwardly therefrom for rigid cooperation with said burner at spaced points on opposite sides of said air mixing passageways and said handle means and said spreader having rigid surfaces extending into overlapping relation with one of said tangs for inter-acting rigid support therewith.

References Cited in the file of this patent
UNITED STATES PATENTS 1,047,572     Sayres _____ Dec. 17, 1912
2,698,653     Hollaway _____ Jan. 4, 1955